(12) United States Patent
Taniguchi

(10) Patent No.: US 9,419,877 B2
(45) Date of Patent: Aug. 16, 2016

(54) CALL PROCESSING TIME MEASUREMENT DEVICE, CALL PROCESSING TIME MEASUREMENT METHOD, AND PROGRAM FOR CALL PROCESSING TIME MEASUREMENT

(75) Inventor: Kunihiro Taniguchi, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 1282 days.

(21) Appl. No.: 12/745,650

(22) PCT Filed: Nov. 28, 2008

(86) PCT No.: PCT/JP2008/071686
§ 371 (c)(1),
(2), (4) Date: Jun. 1, 2010

(87) PCT Pub. No.: WO2009/069763
PCT Pub. Date: Jun. 4, 2009

(65) Prior Publication Data
US 2010/0306370 A1 Dec. 2, 2010

(30) Foreign Application Priority Data
Nov. 30, 2007 (JP) .................... 2007-310095

(51) Int. Cl.
*G06F 15/173* (2006.01)
*H04L 12/26* (2006.01)

(52) U.S. Cl.
CPC ........ *H04L 43/0864* (2013.01); *H04L 43/0817* (2013.01)

(58) Field of Classification Search
CPC .................. H04L 43/0864; H04L 43/0817
See application file for complete search history.

(56) References Cited

U.S. PATENT DOCUMENTS

2003/0126202 A1*  7/2003  Watt ............................ 709/203
2003/0174648 A1*  9/2003  Wang et al. .................. 370/235

(Continued)

FOREIGN PATENT DOCUMENTS

JP    2004-015290 A    1/2004
JP    2004-171226 A    6/2004

(Continued)

OTHER PUBLICATIONS

Foreign Office Action dated Sep. 25, 2012, issued by the Japanese Patent Office in counterpart Application No. 2009-543878.

(Continued)

*Primary Examiner* — Karen Tang
(74) *Attorney, Agent, or Firm* — Sughrue Mion, PLLC

(57) ABSTRACT

To provide a call processing time measurement device which can measure the time required to process a measurement-object message to be measured. When a measurement-object message detection module detects a measurement-object message, a response request message transmission module transmits a response request message towards a node designated as a measurement object right after the measurement-object message. A response request message transmission time record module records the transmission time of the response request message transmitted by the response request message transmission module. A response message reception time record module records the reception time of the response message transmitted from the designated node. A processing time calculation module measures the message processing time of the designated node by calculating a difference between the reception time of the response message and the transmission time of the response request message.

2 Claims, 11 Drawing Sheets

(56) References Cited

U.S. PATENT DOCUMENTS

| | | | |
|---|---|---|---|
| 2003/0227912 A1* | 12/2003 | Kachi | 370/352 |
| 2004/0063454 A1* | 4/2004 | Sasaki | 455/522 |
| 2005/0283639 A1* | 12/2005 | Le Pennec | H04L 41/00 714/4.1 |
| 2006/0041887 A1* | 2/2006 | Dusio | 718/100 |
| 2006/0274372 A1* | 12/2006 | Qutub et al. | 358/1.16 |
| 2007/0112956 A1* | 5/2007 | Chapman et al. | 709/224 |
| 2007/0165624 A1* | 7/2007 | Saito et al. | 370/389 |
| 2007/0281704 A1* | 12/2007 | Lin et al. | 455/445 |
| 2010/0057844 A1* | 3/2010 | Johnson | 709/203 |
| 2011/0252127 A1* | 10/2011 | Iyengar et al. | 709/224 |
| 2012/0124217 A1* | 5/2012 | Bartley et al. | 709/227 |
| 2013/0110761 A1* | 5/2013 | Viswanathan et al. | 706/52 |

FOREIGN PATENT DOCUMENTS

| | | |
|---|---|---|
| JP | 2005-184580 A | 7/2005 |
| JP | 2007-194764 A | 8/2007 |

OTHER PUBLICATIONS

W. R. Stevens, "Ping Program, TCP/IP Illustrated, vol. 1", 1994, pp. 85-96, Chapter 7, Addison-Wesley Publishing Company.

* cited by examiner

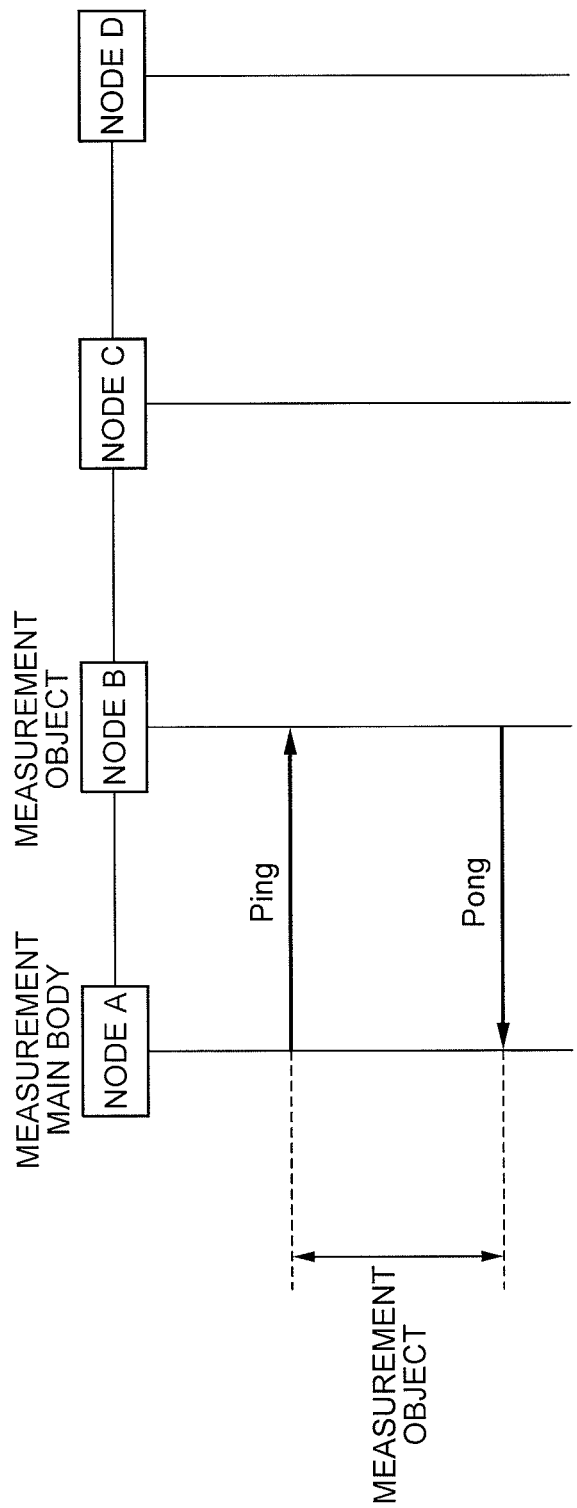

CALL PROCESSING TIME MEASUREMENT DEVICE, CALL PROCESSING TIME MEASUREMENT METHOD, AND PROGRAM FOR CALL PROCESSING TIME MEASUREMENT

TECHNICAL FIELD

The present invention relates to a processing time measurement device, a processing time measurement method, and a program for processing time measurement, which can measure processing time of call processing. More specifically, the present invention relates to a call processing time measurement device, a call processing time measurement method, and a program for measuring call processing time, which can measure processing time of remote call processing systems.

BACKGROUND ART

FIG. 10 is a block diagram showing the structure of a processing time measurement device such as the one depicted in Non-Patent Document 1. The processing time measurement device shown in FIG. 10 is structured with a network interface (network I/F) 1001, a Ping message transmission section 1002, a Ping message transmission time record section 1003, a Pong message reception time record section 1005, and a processing time calculation section 1004.

With the processing time measurement device shown in FIG. 10, the Ping message transmission section 1002 transmits a Ping message at an arbitrary time via the network I/F 1001. The Ping message transmission time record section 1003 records the transmission time at which the Ping message is transmitted by the Ping message transmission section 1002. The Pong message reception time record section 1005 records the reception time of the Pong message received via the network I/F 1001. The processing time calculation section 1004 compares the transmission time of the Ping message with the reception time of the Pong message, and takes the difference thereof as call processing time of an SIP server or the like that is a measurement object.

Note that a message transmitted from a measurement main body towards the measurement object is called a Ping message. A message returned from the measurement object when the Ping message arrives at the measurement object is called a Pong message. That is, the Ping message is a special message that is returned from the measurement object. Typically, the Ping message is structured by including an instruction to return a response for the message explicitly or structured to cause an error so that an error message is returned.

The measurement main body can detect the active/inactive state of the measurement object by receiving the Pong message. Further, the measurement main body judges the measurement time that is a difference between the transmission time of the Ping message and the reception time of the Pong message as the propagation time of the network and the processing time in the measurement object. Assuming that the propagation time of the network is so short that it can be ignored, the measurement time can be considered equal to the processing time in the measurement object. That is, the processing time of the measurement object can be measured by using the Ping message and the Pong message.

As shown in FIG. 11, the Ping message is transmitted to a neighboring node (e.g., a relay server such as an SIP server which communicates with the measurement main body in the network). In a case shown in FIG. 11, node A is the measurement main body, and node B neighboring to the node A is the measurement object. The node B that is the neighboring node performs reception processing of a message. In the reception processing, the node B reads out processing information from a header part of the message, and identifies whether or not to return the message. When judged that it is necessary to return the message, a message is returned as a Pong message. The Ping message can designate a return node. That is, it is also possible to designate the node to which the Pong message is to be transmitted in accordance with the Ping message.

Non-Patent Document 1 shows an example which implements Ping messages with ICMP (Internet Control Message Protocol) and Pong messages with ICMP ECHO REPLY. With SIP (Session Initiation Protocol), it is known to form Ping messages by properly setting transferable-number parameters called "MaxForwards". When "MaxForwards" reaches "0", transfer cannot be done any more. As a result, an error message is to be returned. This error message is used as a Pong message.

Non-Patent Document 1: W. Richard Stevens "TCP/IP Illustrated, Volume 1" Addison-Wesley Publishing Company, 1994, pp. 85-96

DISCLOSURE OF THE INVENTION

Problems to be Solved by the Invention

A first issue is that it is only possible to measure the processing time by having a node neighboring to a measurement main body as a measurement object. The reason is that the node which returns the Ping message dispatched from the measurement main body is the neighboring node of the measurement main body.

A second issue is that the time to be measured is the processing time of the Ping message used for measurement, and it is different from the processing time of the measurement object message that is originally supposed to be measured. In a case where the measurement-object message is returned at the measurement-object node for measuring the processing time of the measurement-object message, the original object that the measurement-object message propagates without being returned is spoiled.

A third issue is that it is not possible to discriminate a node that is the bottleneck out of a series of nodes, in a case where call processing is done via the series of nodes. The reason is that it is not possible to distinguish the processing time of the node that is the bottleneck and the processing time of the node that is not the bottleneck.

It is therefore an object of the present invention to provide a call processing time measurement device, a call processing time measurement method, and a program for call processing time measurement, which can measure processing time of a measurement-object node that is not neighboring to the measurement main body. Further, it is also an object of the present invention to provide a call processing time measurement device, a call processing time measurement method, and a program for call processing time measurement, which can measure processing time of a measurement-object message that is originally supposed to be measured.

Still another object of the present invention is to provide a call processing time measurement device, a call processing time measurement method, and a program for call processing time measurement, which can discriminate the node that is the bottleneck out of a series of nodes when the call processing is done via the series of nodes.

Means for Solving the Problems

In order to achieve the foregoing object, the call processing time measurement device according to the present invention is a call processing time measurement device which detects a state of a measurement-object node by transmitting a message towards the measurement-object node and receiving a response for the message, and the device includes: a measurement-object message detection module which detects a measurement-object message used for measuring message processing time in the measurement-object node; a response request message transmission module which transmits the measurement-object message and transmits a response request message that is a message requesting a response by corresponding to transmission of the measurement-object message, when the measurement-object message detection module detects the measurement-object message; and a monitoring module which receives the response message showing a response for the response request message, and monitors the state of the measurement-object node based on a received condition thereof While the present invention is built as the call processing time measurement device as hardware, the present invention is not limited only to that. The present invention may also be built as a call processing time measurement method. Further, the present invention may be built as a call processing time measurement program as software which causes a computer to execute functions of the structural elements of the call processing time measurement device.

The call processing time measurement method according to the present invention is a call processing time measurement method which detects a state of a measurement-object node by transmitting a message towards the measurement-object node and receiving a response for the message, and the method includes: detecting a measurement-object message used for measuring message processing time in the measurement-object node; transmitting the measurement-object message and transmitting a response request message that is a message requesting a response by corresponding to transmission of the measurement-object message, upon detecting the measurement-object message; and receiving the response message showing a response for the response request message, and monitoring the state of the measurement-object node based on a received condition thereof.

The call processing time measurement program according to the present invention is a call processing time measurement program for detecting a state of a measurement-object node by transmitting a message towards the measurement-object node and receiving a response for the message, and the program causes a computer to execute: a function which detects a measurement-object message used for measuring message processing time in the measurement-object node; a function which transmits the measurement-object message and transmits a response request message that is a message requesting a response by corresponding to transmission of the measurement-object message, upon detecting the measurement-object message; and a function which receives the response message showing a response for the response request message, and monitoring the state of the measurement-object node based on a received condition thereof.

Effects of the Invention

The present invention makes it possible to measure the processing time of the measurement-object node that is not neighboring to the measurement main body. Further, with another mode of the present invention, it is possible to measure the processing time of the measurement-object message that is originally supposed to be measured. Furthermore, with still another mode of the present invention, it is possible to discriminate the node that is the bottleneck out of a series of nodes when the call processing is done via the series of nodes.

BEST MODES FOR CARRYING OUT THE INVENTION

Hereinafter, exemplary embodiments of the invention will be described in detail by referring to the drawings.

The call processing time measurement device according to an exemplary embodiment of the invention is a call processing time measurement device which detects a state of a measurement-object node by transmitting a message directed to the measurement-object node and receiving a response for the message. As the basic structure as shown in FIG. 1, FIG. 2, FIG. 3, FIG. 4, FIG. 6, and FIG. 8, the call processing measurement device includes: a measurement-object message detection module (4, 402, 602, 802) which detects a measurement-object message used for measuring message processing time in the measurement-object node; a response request message transmission module (5, 404, 603, 804) which transmits the measurement-object message and transmits a response request message as a message for requesting a response by corresponding to transmission of the measurement-object message, when the measurement-object message detection module (4, 402, 602, 802) detects the measurement-object message; and a monitoring module (1, 31, 2, 6, 72, 32, 8, 1, 2, 33, 403, 405, 407, 406, 608, 607, 604, 604, 605, 606, 803, 808, 805, 807, 806) which receives the response message showing the response for the response request message, and monitors the state of the measurement-object node based on the reception state.

The exemplary embodiment of the invention detects the measurement-object message used for measuring the message processing time in the measurement-object node, transmits the measurement-object message upon detecting the measurement-object message while transmitting a response request message as a message requesting a response by corresponding to transmission of the measurement-object message, receives the response message showing the response for the response request message, and monitors the state of the measurement-object node based on the reception state.

The call processing time measurement device according to the exemplary embodiment of the invention will be described in more details hereinafter by using a specific example.

In the exemplary embodiment shown in FIG. 1, the monitoring module is built as a structure which includes: a response request message transmission time record module 1 which records time at which the response request message transmission module 5 transmits the response request message; a response message reception time record module 2 which records time at which the response message from the measurement-object node is received; and a processing time calculation module 31 which measures the message processing time in a node designated as the measurement-object node by calculating a difference between the reception time of the response message recorded by the response message reception time record module 2 and the transmission time of the response request message recorded by the response request message transmission time record module 1.

In the call processing time measurement device shown in FIG. 1, the response request message transmission module 5 transmits a response request message towards the node designated as the measurement object right after the measurement-object message, when the measurement-object message detection module 4 detects the measurement-object message used for measuring the message processing time of the node designated as the measurement object. Further, the response request message transmission time record module 1 records the transmission time of the response request message transmitted by the response request message transmission module 5.

The response message reception time record module 2 records the reception time of the response message transmitted from the node designated as the measurement object. Further, the processing time calculation module 31 measures the message processing time of the node designated as the measurement object by calculating a difference between the reception time of the response message recorded by the response message reception time record module 2 and the transmission time of the response request message recorded by the response request message transmission record module 1.

In the exemplary embodiment shown in FIG. 2, the monitoring module is built as a structure which includes: a prior transmission instruction module 7 which requests the response request message transmission module to transmit a response request message towards a node that is prior to the node designated as the measurement object right after the measurement-object message, when the measurement-object message detection module 4 detects the measurement-object message; an immediate transmission instruction module 6 which requests the response request message transmission module to transmit a response request message towards the node designated as the measurement object right after the measurement-object message, when the measurement-object message detection module 4 detects the measurement-object message; a response message reception time record module 2 which records reception times of the response messages transmitted respectively from the node designated as the measurement object and the prior node; and a processing time calculation module 32 which measures the message processing time in the node designated as the measurement-object node by calculating a difference between the response message reception times recorded respectively by the response message reception time record module 2.

In the call processing time measurement device shown in FIG. 2, the response request message transmission module 5 transmits a response request message, when the measurement-object message detection module 4 detects the measurement-object message used for measuring the message processing time of the node designated as the measurement object. At that time, the prior transmission instruction module 7 which requests the response request message transmission module 5 to transmit a response request message towards the node that is prior to the node designated as the measurement object right after the measurement-object message. The immediate transmission instruction 6 requests the response request message transmission module 5 to transmit a response request message towards the node designated as the measurement object right after the measurement-object message. The response message reception time record module 2 records the reception time of the response messages transmitted respectively from the node designated as the measurement object and the prior node. Further, the processing time calculation module 32 measures the message processing time in the node designated as the measurement-object node by calculating a difference between the response message reception times recorded respectively by the response message reception time record module 2.

In the exemplary embodiment shown in FIG. 2, the monitoring module is built as a structure which includes: a return control information changing module 8 which requests the response request message transmission module to transmit a plurality of response request messages by changing return control information for designating the node at which the response request message is returned, when the measurement-object message detection module 4 detects the measurement-object message; a response request message transmission time record module 1 which records respective transmission times of the response request messages transmitted by the response request message transmission module 5; a response message reception time record module 2 which records reception times of the response messages transmitted respectively from a plurality of nodes designated as the measurement objects; and a processing time calculation module 33 which measures the message processing times in the plurality of nodes designated as the measurement-object nodes by calculating differences between the response message reception times recorded by the response message reception time record module 2 and respective transmission times of the response request messages corresponding to the reception times recorded by the response request message transmission record module.

In the call processing time measurement device shown in FIG. 3, the response request message transmission module 5 transmits a response request message that is a message for requesting a response, when the measurement-object message detection module 4 detects the measurement-object message used for measuring the message processing times of the plurality of nodes designated as the measurement objects. At that time, the return control information changing module 8 requests the response request message transmission module 5 to transmit a plurality of response request messages by changing the return control information for designating the node at which the response request message is returned. The response request message transmission time record module 1 records respective transmission times of the response request messages transmitted by the response request message transmission module 5. The response message reception time record module 2 records reception times of the response messages transmitted respectively from the plurality of nodes designated as the measurement objects. Further, the processing time calculation module 33 measures the message processing times in the plurality of nodes designated as the measurement-object nodes by calculating differences between the response message reception times recorded by the response message reception time record module 2 and respective transmission time of the response request messages corresponding to the reception times recorded by the response request message transmission record module 1.

The call processing time measurement devices shown in FIG. 1-FIG. 3 are built-in to an SIP server, for example. Further, the devices may be built-in to a measurement device placed outside the SIP server.

Furthermore, the structures of the call processing time measurement devices shown in FIG. 1-FIG. 3 can be achieved as a program executed by a CPU of the SIP server and the measurement device, for example.

First Exemplary Embodiment

Next, a more specific example of the exemplary embodiment shown in FIG. 1 will be described as a first exemplary embodiment of the invention by referring to FIG. 4.

The call processing time measurement device shown in FIG. 4 additionally provides a transmission instruction section 403 to the monitoring module shown in FIG. 1, and further uses a Ping message as a response request message. Therefore, a measurement-object message detection section 402 is used as the measurement-object message detection module 4 shown in FIG. 1, a Ping message transmission section 404 is used as the response request message transmission module 5 shown in FIG. 1, a Ping message transmission time record module 405 is used as the response request message transmission time record module 1 shown in FIG. 1, a Pong message reception time record module 407 is used as the response message reception time record module 2 shown in FIG. 1, and a processing time calculation section 406 is used as the processing time calculation module 31 shown in FIG. 1, respectively.

The call processing time measurement device shown in FIG. 4 includes a network I/F 401, the measurement-object detection section 402, the transmission instruction section 403, the Ping message transmission section 404, the Ping message transmission time record section 405, the Pong message reception time record section 406, the processing time calculation section 406, and the Pong message reception time record section 407. The network I/F 401, the Ping message transmission section 404, the Ping message transmission time record section 405, the Pong message reception time record section 407, and the processing time calculation section 406 execute the same functions as those of the network I/F 1001, the Ping message transmission section 1002, the Ping message transmission time record section 1003, the Pong message reception time record section 1005, and the processing time calculation section 1004.

The network I/F 401 is an NIC (Network Interface Card), for example, and controls the lower layers of transmission and reception of messages to/from the network. Upon detecting a message (measurement-object message) as a measurement object, the measurement-object message detection section 402 informs so to the transmission instruction section 403. When informed that the measurement-object message is detected, the transmission instruction section 403 requests the Ping message transmission section 404 to transmit a Ping message. In other words, the transmission instruction section 403 gives an instruction to execute transmission. The Ping message transmission section 404 generates the Ping message, and transmits it via the network I/F 401.

The Ping message transmission time record section 405 records the transmission time of the Ping message transmitted from the Ping message transmission section 404. When there is a possibility of having a plurality of transmitted Ping messages whose corresponding Pong messages are not received, the Ping message transmission time record section 405 records the discriminating information of the Ping messages along with the transmission times of the Ping messages. The Pong message reception time record section 407 records the reception times of the Pong messages. The processing time calculation section 406 calculates the time difference between the Ping message transmission time recorded in the Ping message transmission time record section 405 and the Pong message reception time recorded in the Pong message reception time record section 407.

Next, the overall actions of the exemplary embodiment will be described by referring to a block diagram of FIG. 4 and a message flowchart of FIG. 5. In an example shown in FIG. 5, node C is taken as the measurement-object node.

The structure shown in FIG. 4 is provided to the node A that is the measurement main body. When a measurement-object message arrives at the node A, the measurement-object message detection section 402 detects the measurement-object message (t11 in FIG. 5). The measurement-object message is transmitted to node B that is the neighboring node (see S11 in FIG. 5). When the measurement-object message detection section 402 detects the measurement-object message, it is informed to the transmission instruction section 403 that the measurement-object message is detected. The transmission instruction section 403 requests the Ping message transmission section 404 to transmit a Ping message that is set to be returned at the measurement-object node (node C) right after the measurement-object message. The Ping message transmission section 404 generates a Ping message, and transmits it to the node B via the network I/F 401 right after the measurement-object message (see S11' in FIG. 5).

The Ping message transmission time record section 405 records the transmission time (time t12 in FIG. 5) of the Ping message transmitted by the Ping message transmission section 404.

The node B that is not the measurement-object node transfers the received measurement-object message and Ping message to the next node C (see S12, S12' in FIG. 5). Then, the node C that is the measurement-object node receives the measurement-object message, executes the processing of the message (see S14 in FIG. 5), and transfers the measurement-object message to a next node D (time t13 in FIG. 5).

Further, the node C as the measurement-object node receives the Ping message following the measurement-object message. The node C executes the processing of that message. As a result, the Ping message is returned to the node B. That is, it is transmitted to the node B as a Pong message (see S16 in FIG. 5). The node B that is not the measurement-object node receives the Pong message from the node C, and transfers it to the node A that is the measurement main body (see S17 in FIG. 5).

In the node A which has received the Pong message from the node B, the Pong message reception time record section 407 records the Pong message reception time (time t14 in FIG. 5). Further, the processing time calculation section 406 calculates the difference between the Ping message transmission time (time t12) recorded in the Ping message transmission time record section 405 and the Pong message reception time (time t14) recorded in the Pong message reception time record section 407. As will be described hereinafter, the processing time calculation section 406 measures the processing time of the measurement-object message in the node C that is the measurement-object node by calculating (t14-t12).

Next, effects of the exemplary embodiment will be described. It can be assumed that the difference between time t11 at which the measurement main body (node A) detects the measurement-object message and time t12 at which the measurement main body transmits the Ping message is so small that it can be ignored. Further, it can be assumed that the difference between time t13 at which the measurement-object node (node C) transmits the measurement-object message and time t14 at which the measurement main body receives the Pong message is so small that it can be ignored. Therefore, the difference between the time t12 and the time t14 can be considered as the measurement-object message processing time in the measurement-object node.

In the exemplary embodiment, the measurement main body (node A) ensures the assumption that the difference between the time t11 and the time t12 can be ignored through transmitting the Ping message right after the measurement-object message. Further, it is structured to transmit the Ping message that is set to be returned at the measurement-object node and further to calculate the difference between the transmission time of the Ping message and the reception time of the Pong message, so that the measurement-object message processing time in the measurement-object node can be measured.

For example, in a case where an administrator of the system or the like judges that the processing of the node C is late, the administrator designates the node C as the measurement object. As a way of example, in a case where the processing for INVITE message in the node C is judged as late, the INVITE message is taken as the measurement-object message, and the measurement-object message detection section 402 in the measurement main body may inform the transmission instruction section 403 that the measurement-object message is detected upon detecting the INVITE message. Further, the fact that the measurement object is the node C is set in the Ping message transmission section 404 by the administrator or the like, for example.

Then, in that state, the Ping message transmission section 404 transmits a Ping message to set the node to which a Pong message is to be transmitted as the node C, upon receiving a request for transmitting the Ping message from the transmission instruction section 403. That is, the return control information in the Ping message is set to a value corresponding to the set measurement-object node C.

The return control information is the information for designating the node at which the Ping message is returned.

As described above, the exemplary embodiment makes it possible to measure the processing time of the measurement-object node that is not neighboring to the measurement main body. The reason is that the return control information in the Ping message is set to an arbitrary value. In a case of SIP, the value of MaxForwards may be set to positive integer to make it possible to return the message at the node that is ahead by that number.

Desired effects can be obtained by the above-described operations both in a case where the measurement main body generates the measurement-object message and in a case where the measurement main body does not generate the measurement-object message but detects the measurement-object message transmitted by other devices. Further, as a way of example, a Ping message using MaxForwards parameter of SIP can be used as the Ping message that is set to be returned by the measurement-object node. As another example, TTL (Time To Live) of IP (Internet Protocol) can be used.

As an example where the measurement main body generates the measurement-object message, there is considered a case where the Ping message transmission section 603 generates the Ping message by copying the measurement-object message and having the information for designating the node to which the Pong message is returned included in the copied measurement-object message. In that case, the Ping message transmission section 603 may change the copied measurement-object message to a message whose processing load imposed due to the reception of the measurement-object message is smaller than the processing load imposed due to the received message (processing amount or the like imposed due to the message in the node that has received the message).

Second Exemplary Embodiment

Next, a more specific example of the exemplary embodiment shown in FIG. 2 will be described as a second exemplary embodiment of the invention by referring to FIG. 6.

The call processing time measurement device shown in FIG. 6 additionally provides a Ping message transmission time record section 604 to the monitoring module shown in FIG. 2, and further uses a Ping message as a response request message. Therefore, a measurement-object message detection section 602 is used as the measurement-object message detection module 4 shown in FIG. 2, an immediate Ping message transmission instruction section 607 is used as the immediate transmission instruction module 6 shown in FIG. 2, a prior transmission instruction section 608 is used as the prior transmission instruction module 7 shown in FIG. 2, a Ping message transmission section 603 is used as the response request message transmission module 5 shown in FIG. 2, a Pong message reception time record module 605 is used as the response message reception time record module 2 shown in FIG. 2, and a processing time calculation section 606 is used as the processing time calculation module 32 shown in FIG. 2, respectively.

The call processing time measurement device shown in FIG. 6 includes a network I/F 601, the measurement-object detection section 602, the Ping message transmission section 603, the Ping message transmission time record section 604, the Pong message reception time record section 605, the processing time calculation section 606, an immediate transmission instruction section 607, and a prior transmission instruction section 608. The network I/F 601, the measurement-object detection section 602, the Ping message transmission section 603, the Ping message transmission time record section 604, the Pong message reception time record section 605, and the processing time calculation section 606 execute the same functions as those of the network I/F 401, the measurement-object detection section 402, the Ping message transmission section 404, the Ping message transmission time record section 405, the Pong message reception time record section 407, and the processing time calculation section 406. However, in this exemplary embodiment, the calculation processing objects of the processing time calculation section 606 are the reception times of the two Pong messages.

Upon detecting a message as a measurement object, the measurement-object message detection section 602 informs so to the prior transmission instruction section 608 and the immediate transmission instruction section 607. When informed that the measurement-object message is detected, the prior transmission instruction section 608 and the immediate transmission instruction section 607 request the Ping message transmission section 603 to transmit a Ping message. The Ping message transmission section 603 generates the Ping messages according to the requests from the prior transmission instruction section 608 and the immediate transmission instruction section 607, and transmits those via the network I/F 601.

The Ping message transmission time record section 604 records the transmission times of the Ping messages transmitted from the Ping message transmission section 603. When there is a possibility of having a plurality of transmitted Ping messages whose corresponding Pong messages are not received, the Ping message transmission time record section 604 records the discriminating information of the Ping messages along with the transmission times of the Ping messages. The Pong message reception time record section 605 records the reception times of the Pong messages. The processing time calculation section 606 calculates the time difference between the reception times of the two pieces of Pong message recorded in the Pong message reception time record section 605.

The prior transmission instruction section 608 requests the Ping message transmission section 603 to transmit the Ping message that is set to be returned at the node that is before the measurement object right after the measurement-object message. The node located prior to the measurement object is a node such as a server positioned between the measurement-object node and the measurement main body node in the network, and it is a node directly communicating with the measurement-object node. The immediate transmission instruction section 607 requests the Ping message transmission section 603 to transmit the Ping message that is set to be returned at the measurement-object node right after the measurement-object message (more specifically, the ping message transmitted according to the request from the prior transmission instruction section 608).

Next, the overall actions of the exemplary embodiment will be described by referring to a block diagram of FIG. 6 and a message flowchart of FIG. 7. In an example shown in FIG. 7, node D is taken as the measurement-object node.

The structure shown in FIG. 6 is provided to the node A that is the measurement main body shown in FIG. 7. When the measurement-object message detection section 602 detects the measurement-object message, it is informed to the prior transmission instruction section 608 and the immediate transmission instruction section 607 that the measurement-object message is detected. The prior transmission instruction section 608 requests to transmit a Ping message right after the measurement-object message. Further, the immediate transmission instruction section 607 also requests the Ping message transmission section 603 to transmit a Ping message right after the measurement-object message. To transmit the Ping message right after the measurement-object message is to successively transmit the Ping message after transmission of the measurement-object message.

The Ping message transmitting section 603 transmits a first Ping message to the node B following the measurement-object message in response to the request from the prior transmission instruction section 608, and transmits a second Ping message in response to the request from the immediate transmission instruction section 607 (see S21 in FIG. 7). The first Ping message is a Ping message that is set to be retuned at the node that is prior to the measurement-object node (the node C in the case shown in FIG. 7), and the second Ping message is a Ping message that is set to be retuned at the measurement-object node (the node D in the case shown in FIG. 7).

The node B that is not the measurement-object node transfers the first Ping message, the second Ping message, and the measurement-object message to the next node C (see S21' in FIG. 7). The node C that is one before the measurement-object node transfers the second Ping message and the measurement-object message to the node D (see S22 in FIG. 7).

Further, the node C returns the first Ping message. That is, the node C transmits a first Pong message to the node B (see S23' in FIG. 7). The first Pong message arrives at the measurement main body (node A) via the node B (see S23 in FIG. 7). When the first Pong message is received at the node A, the Pong message reception time record section 605 in the node A records the reception time of the received first Pong message.

The node D as the measurement-object node receives the measurement-object message and the second Ping message from the node C (see S22 in FIG. 7). The node D processes the measurement-object message (see S24 in FIG. 7). Upon completing the processing of the measurement-object message, the node D transfers the measurement-object message to a next node (node E). Further, the node D processes the second Ping message following the measurement-object message. As a result, the node D returns a second Pong message (see S26 in FIG. 7).

The second Pong message arrives at the measurement main body via the node C and the node B (see S27, S27' in FIG. 7). In the node A, the Pong message reception time record section 605 records the reception time of the received second Pong message.

The processing time calculation section 606 calculates a difference between the arrival times of the two Pong messages. As described hereinafter, the processing time calculation section 606 is to measure the measurement-object message processing time in the measurement-object node by calculating the difference between the arrival times of the two Pong messages.

Next, effects of the exemplary embodiment will be described. In FIG. 7, it can be assumed that the time at which the measurement-object message arrives at the node D that is the measurement-object node (t21 in FIG. 7) and the time at which the node C generates the first Pong message are almost the same. Further, it can be assumed that the time at which the node D completes the processing of the measurement-object message (t22 in FIG. 7) and the time at which the node D generates the second Pong message are almost the same. Furthermore, it can be considered that the time from the point at which the first Pong message is generated to the point at which it arrives at the measurement main body and the time from the point at which the second Pong message is generated to the point at which it arrives at the measurement main body are almost the same since the paths thereof are the same.

Therefore, in the node A, the difference between the arrival time (time t24) of the second Pong message and the arrival time (time t23) of the first Pong message is considered almost equivalent to the time (time t22-time t21) spent for processing the measurement-object message by the node D that is the measurement-object node. Thus, the processing time calculation section 606 can measure the time spent for processing the measurement-object message by the measurement-object node. With this exemplary embodiment, it is possible to measure the message processing time in the measurement-object node that is not neighboring to the measurement main body even if there is a great delay generated in the network. Further, it is possible to measure the processing time of the measurement-object message that is originally supposed to be measured.

In FIG. 7, (t22-t21) is shown as a measurement object Q that is the idealistic measurement-object time. Further, (t24-t23) is shown as a measurement object P that is the actual measurement-object time of this exemplary embodiment.

As described above, the exemplary embodiment can measure the processing time of the measurement-object message that is originally supposed to be measured. The reason is that the exemplary embodiment creates such a condition that return of the Ping message has to wait for completion of the processing of the measurement-object message through transmitting the Ping message right after the measurement-object message.

Desired effects can be obtained by the above-described operations both in a case where the measurement main body generates the measurement-object message and in a case where the measurement main body does not generate the measurement-object message but detects the measurement-object message transmitted by other devices. Further, as a way of example, a Ping message using MaxForwards parameter of SIP can be used as the Ping message that is set to be returned by the measurement-object node. As another example, TTL of IP can be used.

In the exemplary embodiment, the processing time calculation section 606 calculates the difference between the arrival times of the two Pong messages. That is, the transmission time of the Ping message is not used. Thus, it is not necessary to provide the Ping message transmission time record section 604.

Third Exemplary Embodiment

Next, a more specific example of the exemplary embodiment shown in FIG. 3 will be described as a third exemplary embodiment of the invention by referring to FIG. 8.

The call processing time measurement device shown in FIG. 8 additionally provides a transmission instruction module 803 to the monitoring module shown in FIG. 3, and further uses a Ping message as a response request message. Therefore, a measurement-object message detection section 802 is used as the measurement-object message detection module 4 shown in FIG. 3, a Ping message transmission section 803 is used as the response request message transmission module 5 shown in FIG. 3, a Pong message transmission time record section 805 is used as the response message transmission time record module 1 shown in FIG. 3, a return control information changing section 808 is used as the return control information changing module 8 shown in FIG. 3, a Pong message reception time record module 807 is used as the response message reception time record module 2 shown in FIG. 3, and a processing time calculation section 806 is used as the processing time calculation module 33 shown in FIG. 3, respectively.

The call processing time measurement device shown in FIG. 8 includes a network I/F 801, the measurement-object detection section 802, the transmission instruction section 803, the Ping message transmission section 804, the Ping message transmission time record section 805, the processing time calculation section 806, the Pong message reception time record section 807, and the return control information changing section 808. The network I/F 801, the measurement-object detection section 802, the transmission instruction section 803, the Ping message transmission section 804, the Ping message transmission time record section 805, and the processing time calculation section 806 execute the same functions as those of the network I/F 401, the measurement-object detection section 402, the transmission instruction section 403, the Ping message transmission section 404, the Ping message transmission time record section 405, the Pong message reception time record section 407, and the processing time calculation section 406 of the first exemplary embodiment. However, in this exemplary embodiment, the transmission instruction section 803 gives an instruction to the return control information changing section 808, and the return control information changing section 808 requests the transmission instruction section 803 to transmit the Ping message.

Upon detecting a message (measurement-object message) as a measurement object, the measurement-object message detection section 802 informs so to the transmission instruction section 803. When informed that the measurement-object message is detected, the transmission instruction section 803 requests the Ping message transmission section 804 to transmit the Ping message while requesting the return control information changing section 808 to change the return control information in the Ping message. The Ping message transmission section 804 generates the Ping messages according to the request from the return control information changing section 808, and transmits it via the network I/F 801.

The Ping message transmission time record section 805 records the transmission time of the Ping message transmitted from the Ping message transmission section 804. The Ping message transmission time record section 805 records the discriminating information of the Ping message along with the transmission time of the Ping message. The Pong message reception time record section 807 records the reception time of the Pong message. The processing time calculation section 806 calculates the time difference between the Ping message transmission time recorded in the Ping message transmission time record section 805 and the Pong message reception time recorded in the Pong message reception time record section 807.

Next, the overall actions of the exemplary embodiment will be described by referring to a block diagram of FIG. 8 and a message flowchart of FIG. 9.

The structure shown in FIG. 8 is provided to the node A that is the measurement main body shown in FIG. 9. When a measurement-object message arrives at the node A, the measurement-object message detection section 802 detects the measurement-object message (t31 in FIG. 9). When the measurement-object message detection section 802 detects the measurement-object message, it is informed to the transmission instruction section 803 that the measurement-object message is detected.

The transmission instruction section 803 requests the return control information changing section 808 to change the return control information. The return control information changing section 808 requests the Ping message transmission section 804 to transmit Ping messages by changing the return control information. The Ping message transmission section 804 transmits a plurality of Ping messages each containing the return control information changed by the return control information changing section 808 via the network I/F 801 following the measurement-object message in response to the requests from the Ping message transmission section 804 (see t32 and S31 in FIG. 9). The Ping message transmission time record 805 records the transmission times of each of the Ping messages transmitted by the Ping message transmission section 804.

The measurement-object message and the Ping messages are processed at each of the nodes (the nodes B, C, and D in the case shown in FIG. 9). Each of the nodes B, C, and D transfers the measurement-object message and the Ping message that is not set to be returned at the node itself according to the return control information to the next node (see S32, S33 in FIG. 9). Each node returns the Ping message that is set to be returned by the node itself according to the return control information. That is, each node returns the Pong message. FIG. 9 shows an example where the node B neighboring to the node A that is the measurement main body returns the first Ping message, the next node C returns the second Ping message, and the next node D returns the third Ping message (see S23, S26, and S28 in FIG. 9). Therefore, the node A receives a plurality of Pong messages (S23, S27, S29', and S29 in FIG. 9).

In the node A as the measurement main body, the Pong message reception time record section 807 records the reception times of each of the received Pong messages. As will be described hereinafter, the processing time calculation section 806 can measure the measurement-object message processing time in each node by calculating the difference between the transmission times of the first Ping message recorded in the Ping message transmission time record section 805 and the reception times of the plurality of Pong messages recorded in the Pong message reception time record section 807. Specifically, the processing time calculation section 806 takes the difference between the reception time of the Pong message and the transmission time of the Ping message corresponding to the Ping message reception time as the measurement-object message processing time in each of the nodes. The Ping message corresponding to the Ping message reception time is the Ping message directed to the sender of the Pong message.

Next, effects of the exemplary embodiment will be described. In FIG. 9, it can be assumed that the difference between time t31 at which the node A as the measurement-object node detects the measurement-object message and time t31' at which the node A transmits the Ping message is sufficiently small. Similarly, it can be assumed that the differences ((t32-t32'), (t33-t33'), (t34-t34')) between respective times t32, t33, t34 at which the measurement-object node completes the measurement-object message processing and transmits the measurement-object message to the next node and respective times t32', t33', t34' at which the node A receives the Pong messages are sufficiently small. The processing time of the measurement-object message in the nodes B, C, and D as the measurement-object nodes is b=(t32-t31), c=(t33-t32), d=(t34-t33), respectively, and the processing result of the processing time calculation section 806 is b'=(t32'-t31'), c'=(t33'-t32'), d'=(t34'-t33'), respectively. It can be considered that those are almost the same (b and b', c and c', d and d'). That is, the processing result of the processing time calculation section 806 can be considered as the measurement-object message processing time in each of the nodes.

In FIGS. 9, (t32-t31), (t33-t32), and (t34-t33) are shown as the measurement objects b, c, and d of the idealistic measurement-object times. Further, (t32'-t31'), (t33'-t32'), and (t34'-t33') are shown as b', c', and d' of the actual measurement-object times of the exemplary embodiment.

In the exemplary embodiment, the measurement-main body node transmits a plurality of Ping messages by changing the return control information right after the measurement-object message. Further, the exemplary embodiment is structured to record the Ping message transmission times and the reception times of a plurality of Pong messages, and to calculate the difference therebetween. Therefore, in a case where call processing is executed via a series of nodes, it is possible to measure the message processing time in each of the series of nodes.

As a result, the node that is the bottleneck can be specified out of the series of nodes which execute the call processing. Specifically, a comparison section that is included in the processing time calculation section 806, for example, compares b', c', and d' as the processing result of the processing time calculation section 806, and judges that the node corresponding to the largest value among those is the bottleneck. Further, it is possible to measure the message processing time in the measurement-object node that is not neighboring to the measurement-main body. Furthermore, it is possible to measure the processing time of the measurement-object message that is originally supposed to be measured.

For example, in a case where an administrator of the system or the like judges that the processing of one of the nodes B-C is late, the administrator designates the nodes B-C as the measurement objects. As a way of example, in a case where the processing for INVITE message in the node C is judged as late, the INVITE message is taken as the measurement-object message, and the measurement-object message detection section 802 in the measurement main body may inform the transmission instruction section 803 that the measurement-object message is detected upon detecting the INVITE message. Further, the fact that the measurement objects are the nodes B-C is set in the return control information changing section 808 by the administrator or the like. Then, in that state, the Ping message transmission section 804 transmits a plurality of Ping messages to set the nodes to which a Pong message is to be transmitted as each of the nodes B-C, upon receiving a request for transmitting the Ping message from the return control information changing section 808. In the case shown in FIG. 9, it takes time for processing the measurement-object message in the node C (see S34 in FIG. 9), so that the time calculated by the processing time calculation section 806, c'=(t33'-t32') is long. Therefore, the node C is specified as the node that is the bottleneck.

As described above, the exemplary embodiment makes it possible to discriminate the node that is the bottle neck out of a series of nodes, when call processing is executed via the series of nodes. The reason is that the exemplary embodiment transmits a plurality of Ping messages by changing the return control information right after the measurement-object message, and measures the interval therebetween upon receiving a plurality of reception messages to find the bottleneck from the relation between the return-object nodes and the interval.

Desired effects can be obtained by the above-described operations both in a case where the measurement main body generates the measurement-object message and in a case where the measurement main body does not generate the measurement-object message but detects the measurement-object message transmitted by other devices. Further, as a way of example, a Ping message using MaxForwards parameter of SIP can be used as the Ping message that is set to be returned by the measurement-object node. As another example, TTL of IP can be used.

While the present invention has been described by referring to the embodiments (and examples), the present invention is not limited only to those embodiments (and examples) described above. Various kinds of modifications that occur to those skilled in the art can be applied to the structures and details of the present invention within the scope of the present invention.

This Application claims the Priority right based on Japanese Patent Application No. 2007-310095 filed on Nov. 30, 2007 and the disclosure thereof is hereby incorporated by reference in its entirety.

INDUSTRIAL APPLICABILITY

The present invention can be applied for being built-in to an SIP server and the like, which makes it possible to specify a server that cannot perform sound call processing, and provide information for avoiding that server. Further, the present invention can be implemented as a measurement device so as to identify the SIP server or the like which causes congestion when there is an occurrence of failure.

BRIEF DESCRIPTION OF THE DRAWINGS

FIG. 11 is a message flowchart showing actions of the call processing time measurement device shown in FIG. 10.

REFERENCE NUMERALS

Figure 1:
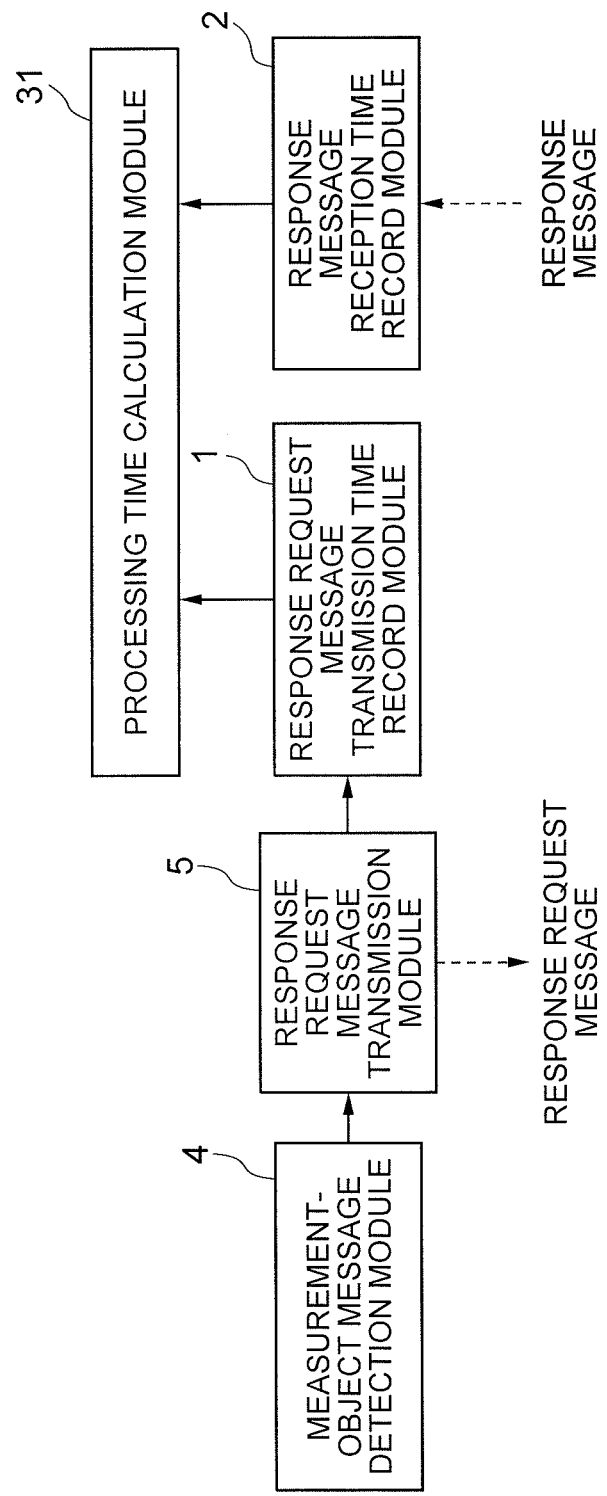
FIG. 1 is a block diagram showing the structure of a call processing time measurement device according to the present invention.
Figure 2:
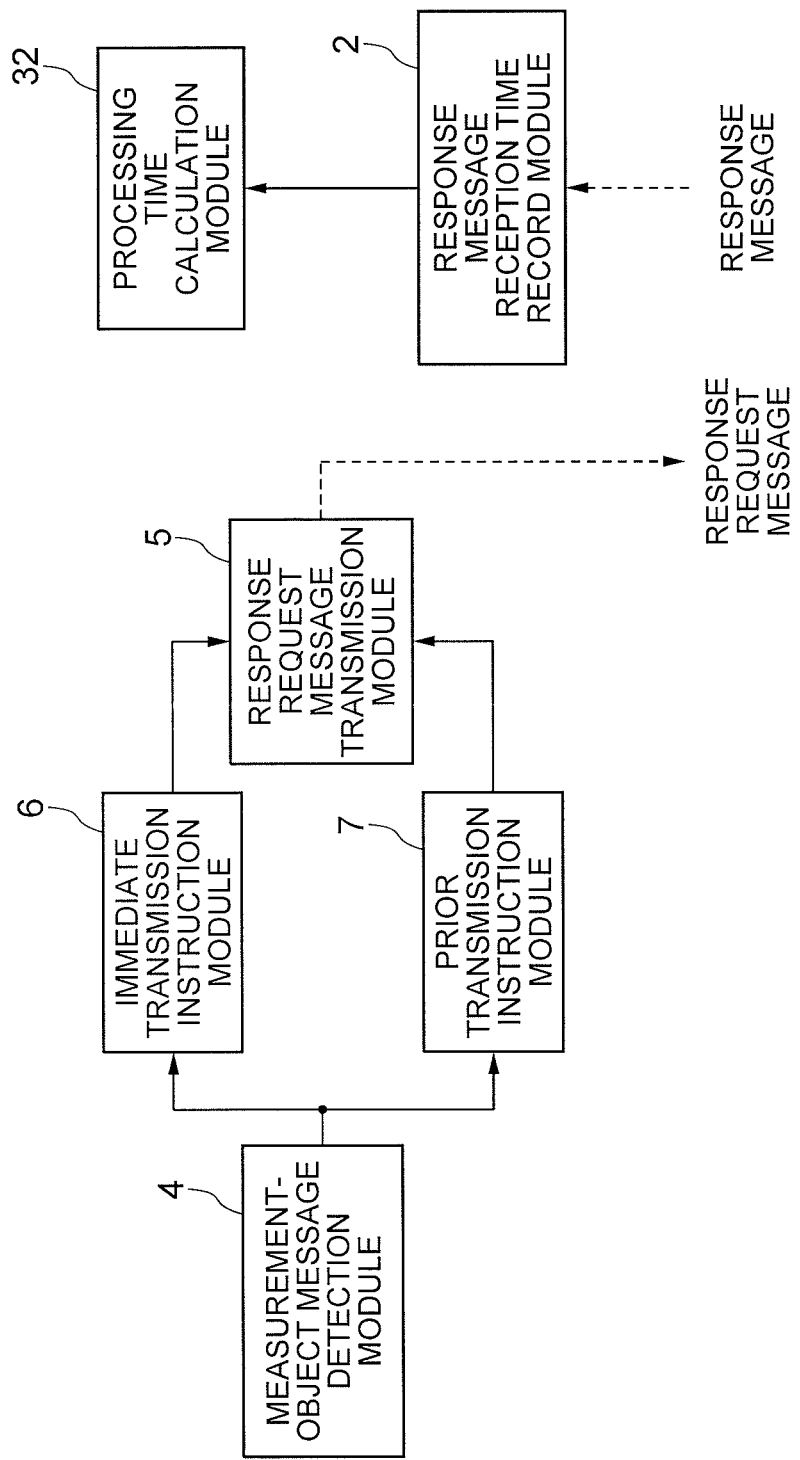
FIG. 2 is a block diagram showing the structure of a call processing time measurement device according to another mode of the present invention.
Figure 3:
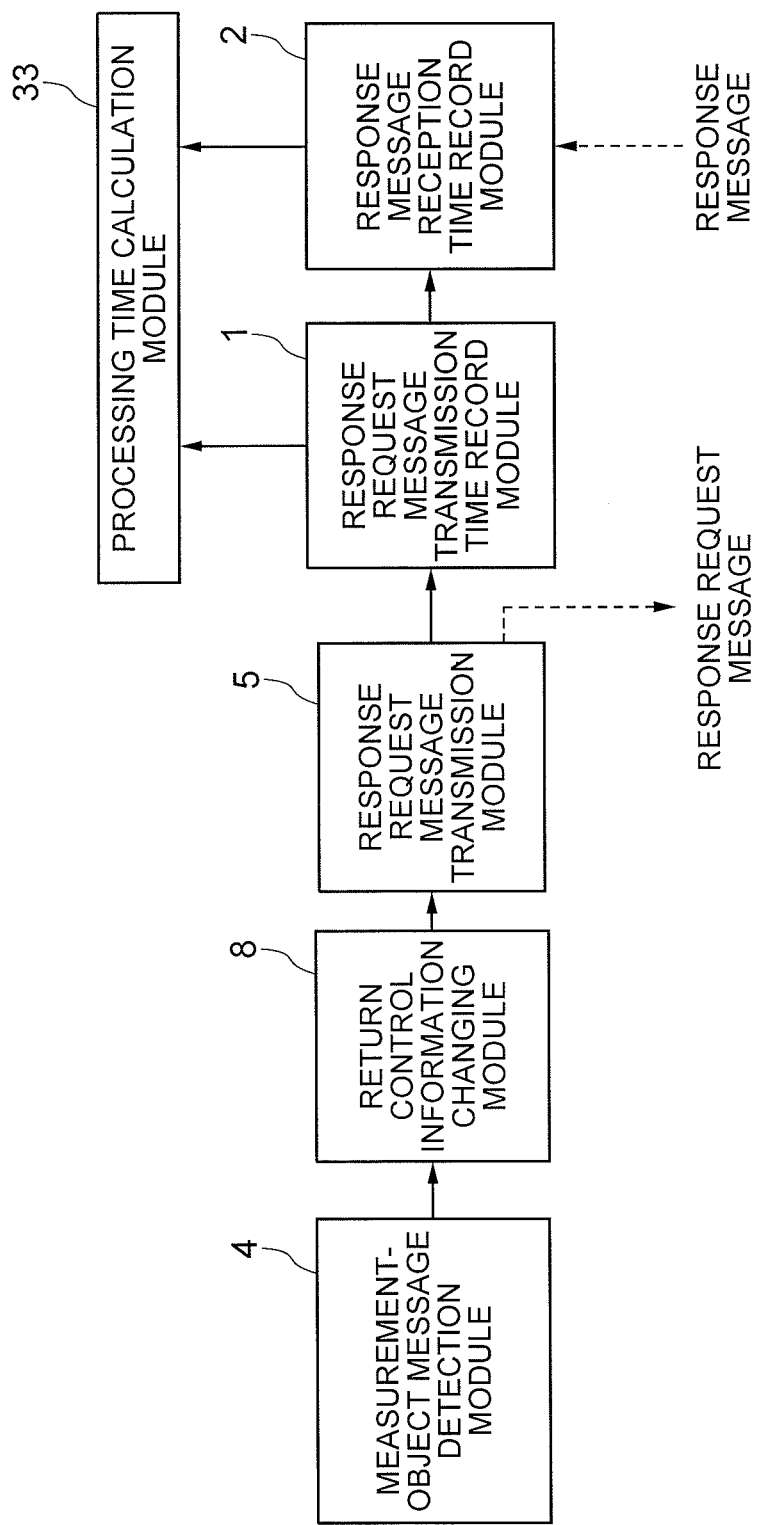
FIG. 3 is a block diagram showing the structure of a call processing time measurement device according to still another mode of the present invention.
Figure 4:
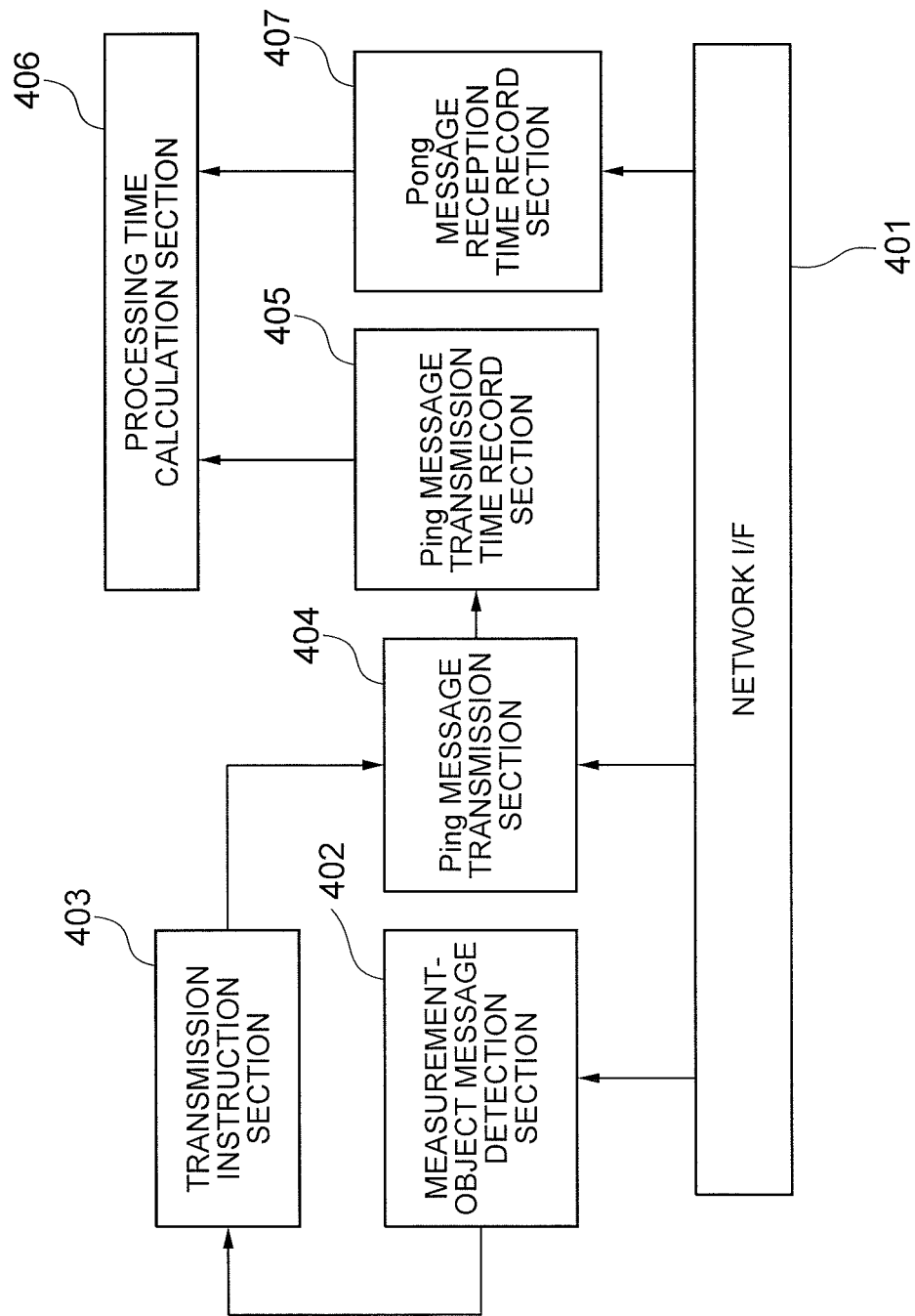
FIG. 4 is a block diagram showing the structure of a call processing time measurement device in a call processing time measurement system according to a first exemplary embodiment of the invention.
Figure 5:
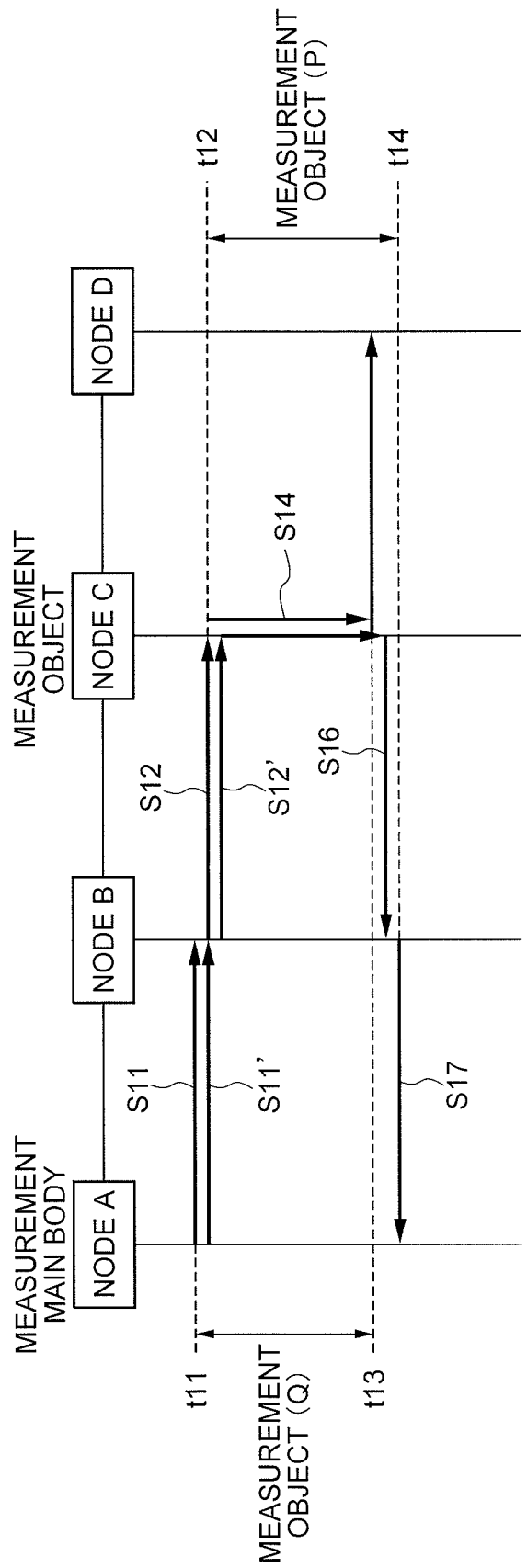
FIG. 5 is a message flowchart showing actions of the first exemplary embodiment.
Figure 6:
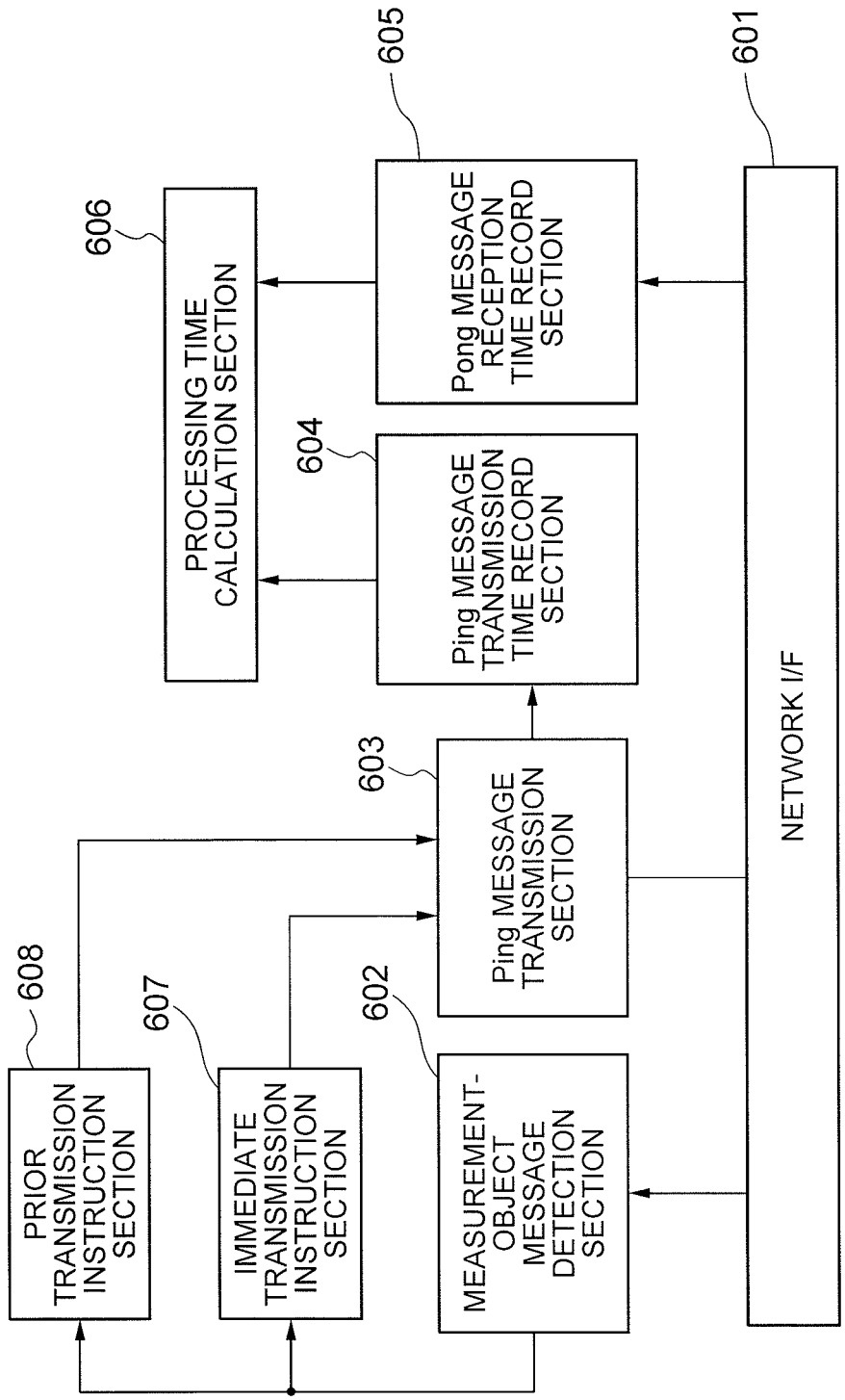
FIG. 6 is a block diagram showing the structure of a call processing time measurement device in a call processing time measurement system according to a second exemplary embodiment of the invention.
Figure 7:
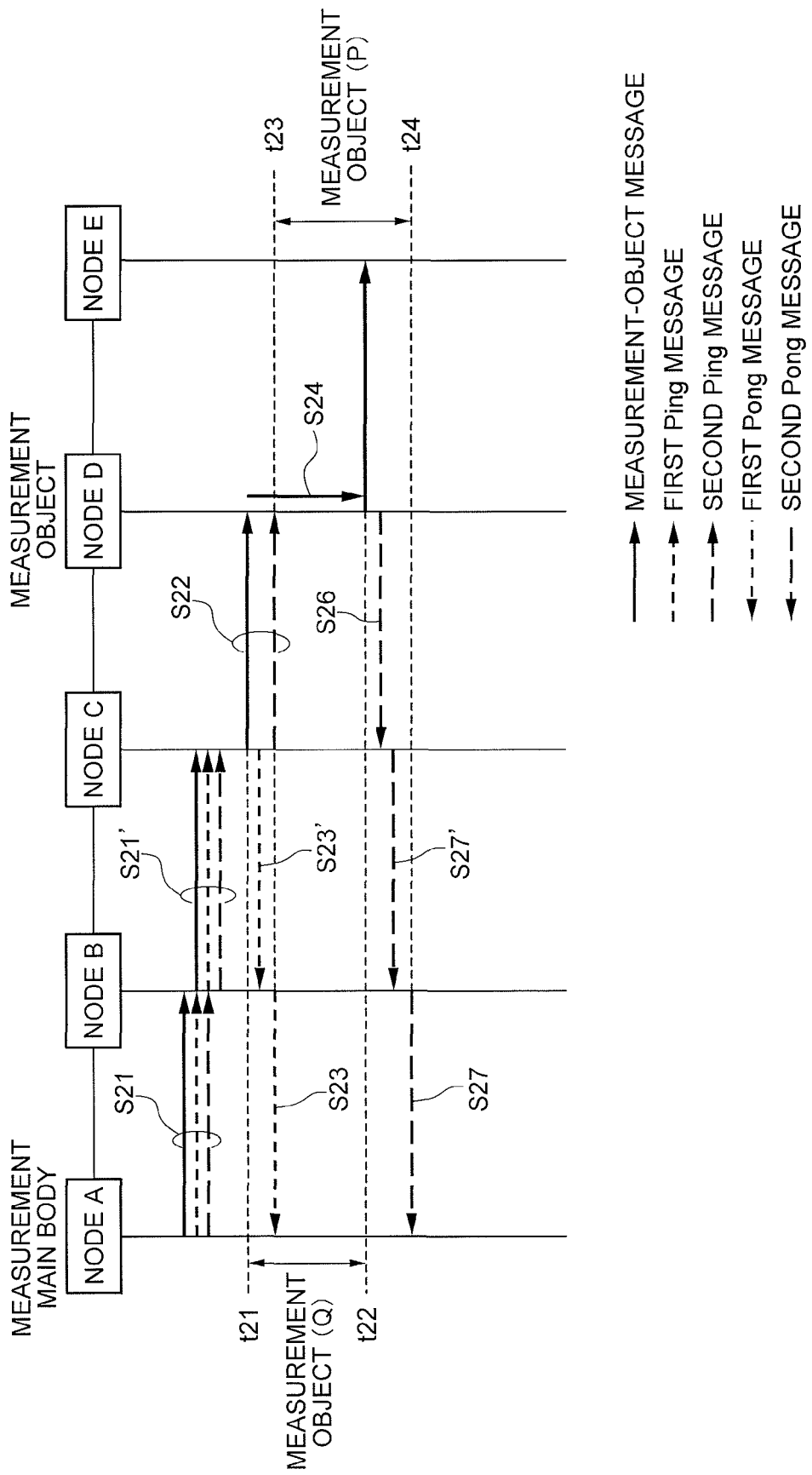
FIG. 7 is a message flowchart showing actions of the second exemplary embodiment.
Figure 8:
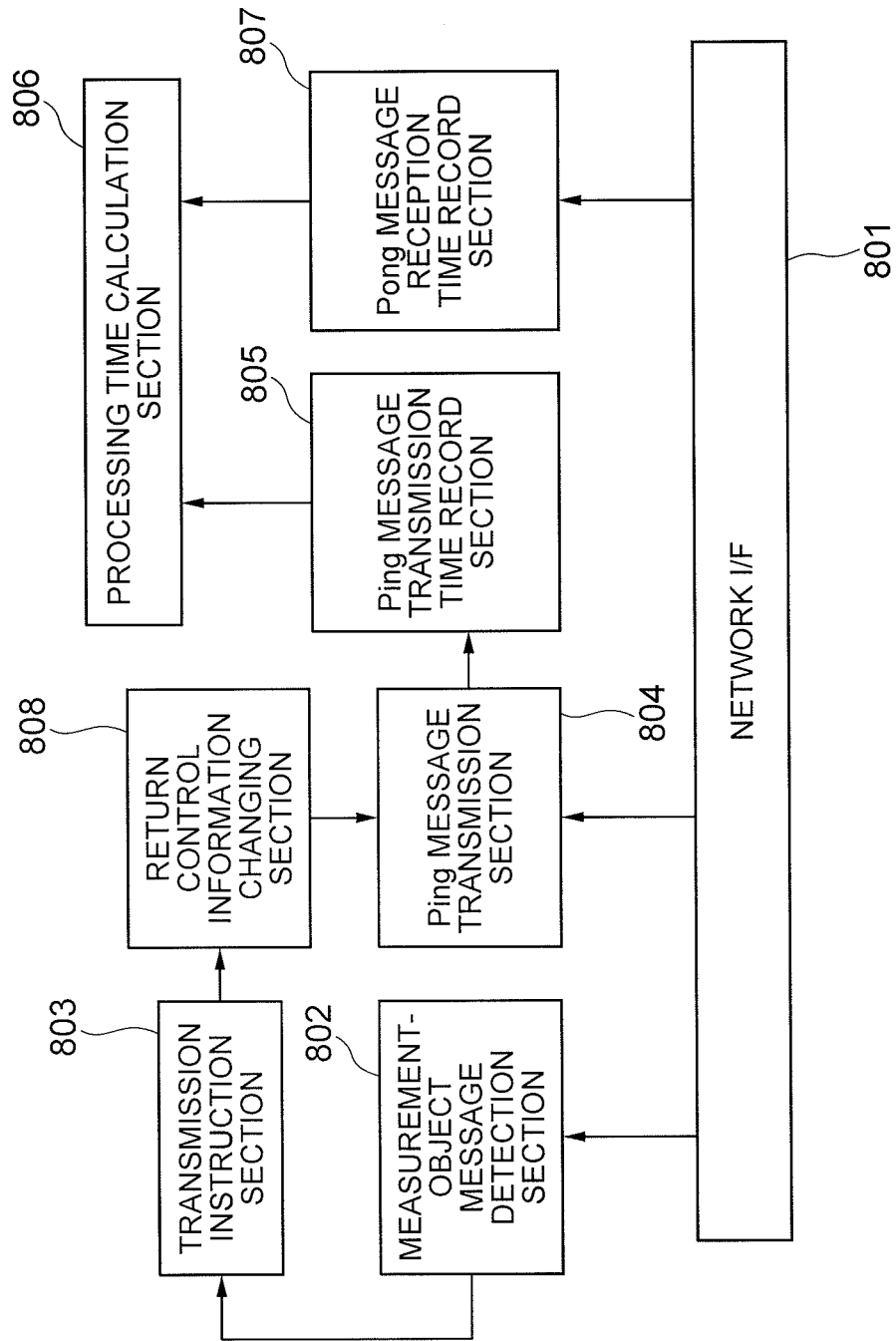
FIG. 8 is a block diagram showing the structure of a call processing time measurement device in a call processing time measurement system according to a third exemplary embodiment of the invention.
Figure 9:
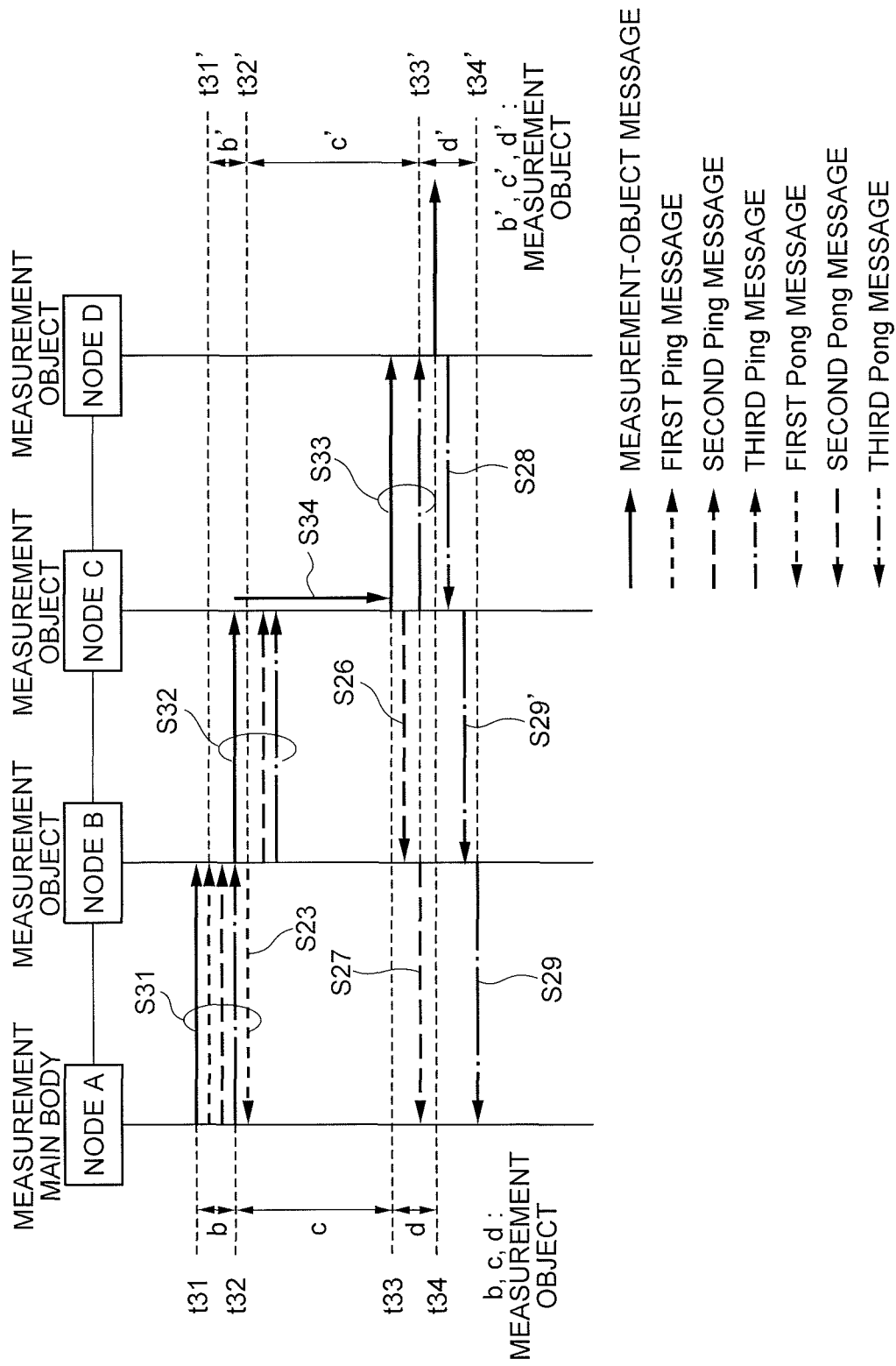
FIG. 9 is a message flowchart showing actions of the third exemplary embodiment.
Figure 10:
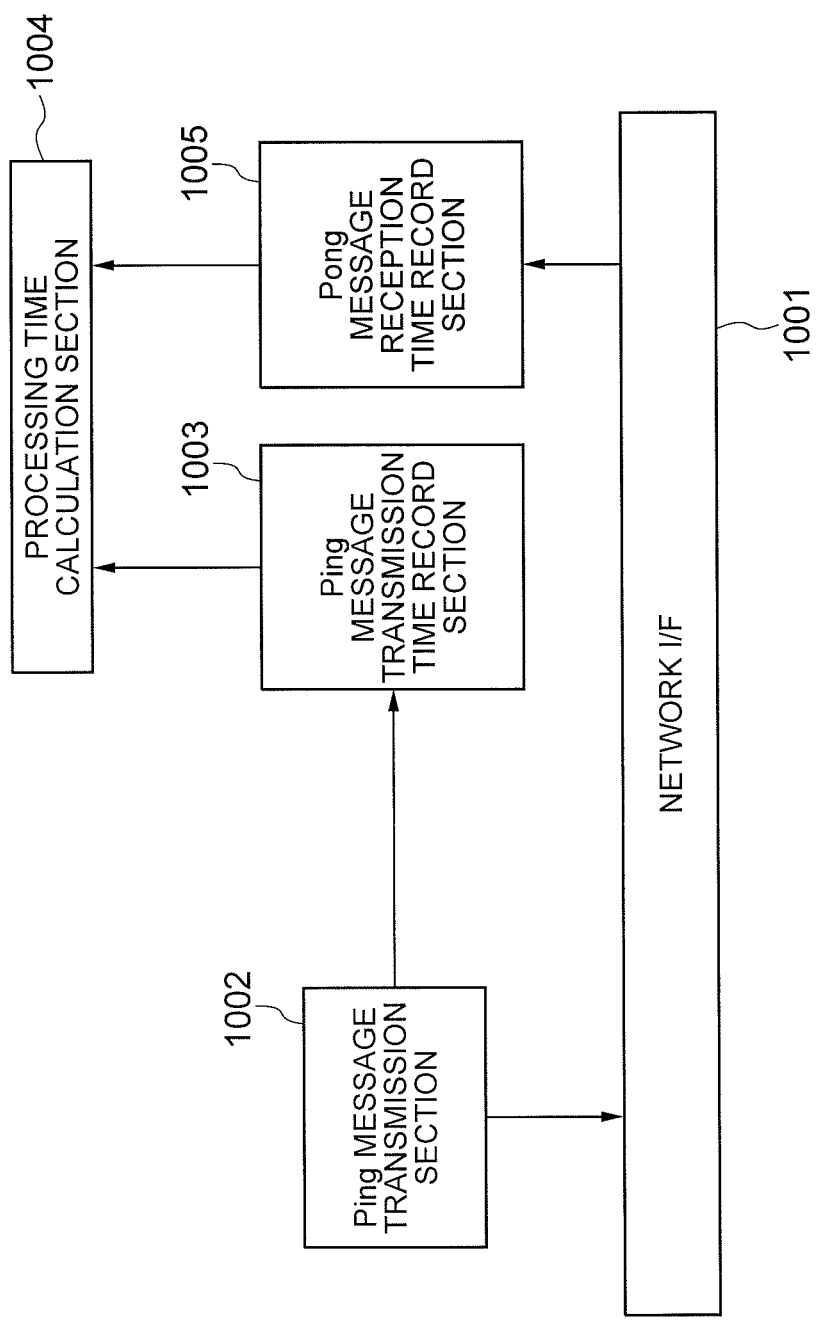
FIG. 10 is a block diagram showing the structure of a call processing time measurement device according to a related technique.

401 Network I/F 401
402 Measurement-object message detection section

403 Transmission instruction section
404 Ping message transmission section
405 Ping message transmission time record section
406 Processing time calculation section
406 Pong message reception time record section
601 Network I/F
602 Measurement-object message detection section
603 Ping message transmission section
604 Ping message transmission time record section
605 Pong message reception time record section
606 Processing time calculation section
607 Immediate transmission instruction section
608 Prior transmission instruction section
801 Network I/F
802 Measurement-object message detection section
803 Transmission instruction section
804 Ping message transmission section
805 Ping message transmission time record section
806 Processing time calculation section
807 Pong message reception time record section
808 Return control information changing section

The invention claimed is:

1. A call processing time measurement device comprising at least a node A that is a measurement main body, a node B and a node C that are neighboring to the node A within a network, and a node D that is a measurement object,
wherein the node A comprises:
a measurement-object message detection section configured to detect a measurement-object message and to transmit the measurement-object message to the node B;
a prior transmission instruction section configured to request to transmit a first Ping message that is set to be returned by the node C after the measurement-object message has been processed by the node C, when informed that the measurement-object message has been detected by the measurement-object detection section;
an intermediate transmission instruction section configured to request to transmit a second Ping message that is set to be returned by the node D after the measurement-object message has been processed by the node D, when informed that the measurement-object message has been detected by the measurement-object detection section;
a Ping message transmission section configured to transmit the first Ping message to the node B after transmitting the measurement-object message in response to the request from the prior transmission instruction section, and to transmit the second Ping message to the node B after transmitting the measurement-object message in response to the request from the intermediate transmission instruction section;
a Pong message reception time record section configured to record a reception time of a first Pong message that is a return of the transmitted first Ping message and a reception time of a second Pong message that is a return of the transmitted second Ping message; and
a processing time calculation section configured to calculate a difference between the recorded reception times of the first Pong message and the second Pong message,
wherein each of the first Ping message and the second Ping message uses a MaxForwards parameter according to Session Initiation Protocol (SIP); and
wherein the node B transfers the first Ping message, the second Ping message, and the measurement-object message to the node C, and the node C transfers the second Ping message and the measurement-object message to the node D and transmits the first Pong message to the node B, and
wherein the node D receives the measurement-object node message and the second Ping message from the node C, transfers the measurement-object message to a next node E after completing processing of the measurement-object message, processes the second Ping message after processing the measurement-object message, and transmits the second Pong message to the node C, and
wherein the processing time calculation section is further configured to measure a measurement-object message processing time in the node D based on the calculated difference between the recorded reception times of the first Pong message and the second Pong message, and to use the measured processing time to determine whether the node D is causing a call processing delay.

2. A call processing time measurement method applied to at least a node A that is a measurement main body, a node B and a node C that are neighboring to the node A within a network, and a node D that is a measurement object, the method comprising:
detecting, by a measurement-object message detection section of the node A, a measurement-object message;
requesting, by a prior transmission instruction section of the node A, to transmit a first Ping message that is set to be returned by the node C after the measurement-object message has been processed by the node C, when informed that the measurement-object message has been detected;
requesting, by an intermediate transmission instruction section of the node A, to transmit a second Ping message that is set to be returned by the node D after the measurement-object message has been processed by the node D, when informed that the measurement-object message has been detected;
transmitting, by a Ping message transmission section of the node A, the first Ping message to the node B after transmitting the measurement-object message in response to the request from the prior transmission instruction section, and transmitting, by the Ping message transmission section of the node A, the second Ping message to the node B after transmitting the measurement-object message in response to the request from the intermediate transmission instruction section;
recording, by a Pong message reception time record section of the node A, a reception time of a first Pong message that is a return of the transmitted first Ping message and a reception time of a second Pong message that is a return of the transmitted second Ping message; and
calculating, by a processing time calculation section of the node A, a time difference between the reception times of the first Pong message and the second Pong message,
wherein each of the first Ping message and the second Ping message uses a MaxForwards parameter according to Session Initiation Protocol (SIP); and
wherein the node B transfers the first Ping message, the second Ping message, and the measurement-object message to the node C, and the node C transfers the second Ping message and the measurement-object message to the node D and transmits the first Pong message to the node B, and
wherein the node D receives the measurement-object node message and the second Ping message from the node C, transfers the measurement-object message to a next node E after completing processing of the measurement-object message, processes the second Ping message after processing the measurement-object message, and transmits the second Pong message to the node C, and wherein the method further comprises measuring, by the processing time calculation section of the node A, a measurement-object message processing time in the node D based on the calculated difference between the recorded reception times of the first Pong message and the second Pong message, and using, by the processing time calculation section of the node A, the measured processing time to determine whether the node D is causing a call processing delay.

* * * * *